3,801,619
NITRILE PROCESS

Walter A. Butte, Jr., West Chester, and Philmore M. Scudder, Havertown, Pa., assignors to Sun Research and Development Co., Philadelphia, Pa.
No Drawing. Filed July 23, 1971, Ser. No. 165,731
Int. Cl. C07c 121/02
U.S. Cl. 260—465 C                     10 Claims

ABSTRACT OF THE DISCLOSURE

A process for making nitriles from alkyl substituted aromatic hydrocarbons by contacting vapors of said alkyl aromatic hydrocarbon and vaporized ammonium polysulfide at a temperature of about 300° to about 500° C., at essentially atmospheric pressure, and in the presence of a catalyst comprising a higher oxide of elements of Groups V-B, VI-B, the lanthanide group, and the actinide group.

---

It is known in the prior art to oxidize alkyl aromatic compounds to aromatic carboxylic acids by heating the alkyl aromatic with sulfur and ammonia in an aqueous system under pressure. Thus, U.S. 2,722,548 (H. J. Aroyan, issued Nov. 1, 1955) illustrates the oxidation of xylenes to phathalic acids by such a process. It is also known from the disclosure of U.S. 2,783,266 (W. G. Toland, issued Feb. 26 1957) that nitriles may be made by a liquid phase reaction of an anhydrous mixture of sulfur, ammonia and an alkyl substituted cyclic compound at 400° to 700° F., the reaction being carried out desirably at a superatmospheric pressure sufficient to maintain a liquid phase in the reaction zone.

It has now been found, however, that conversion of alkyl aromatic compounds to nitriles can be achieved by a vapor phase sulfurative oxidation in the presence of water vapor and this is particularly surprising because it would be expected that in situ hydrolysis of the nitriles to acids would occur.

In accord with the process of the invention, nitriles are obtained by contacting in the vapor phase a mixture of an alkyl aromatic hydrocarbon and vaporized aqueous ammonium polysulfide in the presence of a catalyst comprising a higher oxide of elements selected from the group consisting of Groups V-B, VI-B, the lanthanide group, and the actinide group elements, said sulfurative oxidation process being carried out at a temperature between about 300° C. and about 500° C. and at essentially atmospheric pressure. The nitriles made by the process of the invention are well known compounds which are readily hydrolyzed to the corresponding carboxylic acids.

The alkyl aromatic compounds useful in the process of the invention will include those lower alkyl-substituted aromatics of the benzene and naphthalene series. However, the preferred group of compounds with which the process will be carried out are those of the benzene series and most preferably, toluene and the xylenes. A particularly valuable attribute of the invention is its high selectivity for yielding nitriles.

As indicated, the catalysts used in the process are those higher oxides of elements of Groups V-B, V-IB, the lanthanide group, and the actinide group. By higher oxide is meant an element as defined having an oxidation number greater than three. "Oxidation number" is a well-known term and is described in detail in "The Encyclopedia of Chemistry," 2nd ed., Clark and Hawley, Reinhold Publishing Corporation, 1966. Preferably, the catalysts will be the higher oxides of vanadium, molybdenum, cerium and uranium; e.g., $V_2O_5$, $MoO_3$, $CeO_2$ and $U_3O_8$. It is to be understood that the oxide catalyst may be used alone as powders, pellets, granules, etc., but will also be used on supports such as silica, alumina, kaolin and other clays and the like. Also, it will be understood that combinations of catalysts may be employed in the process of the invention and that inorganic additives which serve as promoters may be used with them. Preferred catalysts include $CeO_2$ on alumina, $U_3O_8$ on alumina, $V_2O_5$ on silica-alumina, $V_2O_5$ on kaolin, $MoO_3$ on $\gamma$-alumina, and $V_2O_5$ promoted with sulfate. Many of these catalysts are commercially available or can readily be prepared by conventional techniques. Supported catalysts will generally contain from about 1% to 10%, preferably about 5%, by weight of oxide on the support.

The ammonium polysulfide used in the process is readily prepared in the usual manner from a suspension of sulfur in ammonium hydroxide by bubbling hydrogen sulfide gas through the mixture. The actual concentration of ammonium polysulfide is not important, but a practical procedure will be to use about 25 to 75 parts by weight of sulfur in about 300 to about 600 parts of about 15 molar ammonium hydroxide. Hydrogen sulfide is bubbled through such a mixture until all of the sulfur dissolves and the reaction mass becomes homogeneous. This solution provides the ammonium polysulfide during the reaction and it is introduced into the system simply by vaporizing the liquid and conducting the vapors into the system either with or without an inert sweep-gas (e.g. nitrogen, helium, etc.). It will be understood that vaporization of the ammonium polysulfide solution effects degradation of the polysulfide to vapors of ammonia, sulfur, polysulfides, and related sulfur containing moieties which are the active reactants in the oxidation. The reactants are passed through the system for a catalyst contact time of preferably about 20 to 30 seconds, although contact times of from about 10 seconds to about 60 seconds are generally applicable to the process.

The nitrile reaction products are readily recovered from the system by any conventional procedure: e.g. condensation, distillation, etc.

In order to further illustrate the invention the following examples are given.

EXAMPLE 1

Twenty-one grams of cerium nitrate [$Ce(NO_3)_3 \cdot 6H_2O$] are dissolved in 50 ml. of water. Ninety-five grams of alumina 1/8" pellets (Alcoa H-151) are mixed with 30 ml. of the cerium nitrate solution and the water is evaporated in a roto-evaporator. The resulting impregnated solid is then calcined for 3 hours at 500° C. 100 grams of this catalyst (5% $CeO_2$) is changed into a vertical pipe reactor equipped for heating.

An ammonium polysulfide solution is made by bubbling $H_2S$ through a suspension of 50 g. of sulfur in 585 ml. of 15 M $NH_4OH$ solution until complete solution occurs. This ammonium polysulfide solution is vaporized at the top of the heated reactor which is held at 450° C. by feeding the polysulfide solution with a syringe pump over a period of about two hours to assure complete contact with the catalyst. The rate of charge is 0.115 ml. per minute. Then, in a second syringe, $30.9 \times 10^{-3}$ moles of toluene are slowly introduced into the reactor simultaneously with the ammonium polysulfide. The rate of hydrocarbon passage through the reactor is 0.03 ml. per minute. The reaction is run for about 5.5 hours with intermittent sampling. The products are separated by gas chromatography and identification of products is made by GC, mass spectroscopy and infrared. Nuclear magnetic reasonance analysis is used for confirmation.

The analysis indicates a 47.4% conversion per pass of benzonitrile as the only product.

EXAMPLE 2

Using a 10% $V_2O_5$ catalyst on kaolin, toluene is reacted with ammonium polysulfide for 4.5 hours in accord with the technique described in Example 1.

Analysis indicates a 71.6% conversion per pass to give a product distribution of 95.6% benzonitrile.

EXAMPLE 3

Fourteen and nine-tenths grams of uranyl nitrate $[UO_2(NO_3) \cdot 6H_2O]$ are dissolved in 50 ml. of water. Ninety-five grams of alumina 1/8" pellets (Alcoa F–110) are mixed with 30 ml. of the uranyl nitrate solution and the water is evaporated in a roto-evaporator. The resulting impregnated sold is then calcined for 3 hours at 800° C. to yield a 5% by weight $U_3O_8$ catalyst on alumina.

Following the details of Example 1, $30.9 \times 10^{-3}$ moles of m-xylene is reacted with ammonium polysulfide for about four hours. Analysis indicates a 10% conversion per pass to a product of 61% nitriles.

EXAMPLE 4

Following the details of Example 1, m-xylene is reacted for 4.5 hours over a 12% $MoO_3$ catalyst supported on γ-alumina to give 17.1% conversion per pass to a product of 31.2% nitrile.

EXAMPLE 5

In accord with the details of Example 1, but using a catalyst consisting of 9% $V_2O_5$, 20% $K_2SO_4$, and 11% $SO_3$ (Grace, Code No. 903-08-5X1949), m-xylene is converted to a product of 84% nitriles at a 32% conversion per pass.

EXAMPLE 6

Following the essential details of Example 1, but using a catalyst of 44% $V_2O_5$ and 24.7% free vanadium supported on silica-alumina (87% Si, 13% Al). The m-xylene is converted to a product of 99% nitrile (benzonitrile, toluonitrile, and isophthalonitrile) at a conversion per pass of 27.7%.

EXAMPLE 7

When Example 6 is repeated with a similar silica-alumina supported vanadium oxide catalyst containing 33% $V_2O_5$ and 18.5% free vanadium, the conversion per pass was 39.7% to a product of 96.5% nitriles (benzonitrile, toluonitrile, and isophthalonitrile).

EXAMPLE 8

Following the details of Example 1 with a 10% $V_2O_5$ catalyst supported on kaolin effects a 26.3% conversion per pass of m-xylene to a product of 98% nitriles (benzonitrile, toluonitrile, and isophthalonitrile).

EXAMPLE 9

When Example 8 is repeated with p-xylene, a 7.6% conversion per pass is obtained to a product of 14.6% nitrile.

EXAMPLE 10

When Example 8 is repeated with o-xylene for a 3.3 hour reaction time, a 39.7% conversion per pass is obtained to a product of 96.5% nitrile.

Similar results are obtained with other alkyl aromatic hydrocarbons. Thus, mesitylene, α-methylnaphthalene, 2,6-dimethylnaphthalene, and the like yield the corresponding nitriles.

The invention claimed is:

1. A process for making nitriles from lower alkyl substituted aromatic hydrocarbons of the benzene and naphthalene series which comprises contacting in the vapor phase a mixture of said alkyl substituted hydrocarbon and vaporized aqueous ammonium polysulfide in the presence of catalyst selected from the group consisting of a higher oxide of vanadium, molybdenum, cerium, and uranium, said process being carried out at a temperature between about 300° C. and about 500° C. and at essentially atmospheric pressure.

2. The process of claim 1 where the hydrocarbon is toluene.

3. The process of claim 1 where the hydrocarbon is xylene.

4. The process of claim 1 where the hydrocarbon is toluene and the catalyst is $CeO_2$ supported on alumina.

5. The process of claim 1 where the hydrocarbon is toluene and the catalyst is $V_2O_5$ supported on kaolin.

6. The process of claim 1 where the hydrocarbon is xylene and the catalyst is $U_3O_8$ supported on alumina.

7. The process of claim 1 where the hydrocarbon is xylene and the catalyst is $MoO_3$ supported on γ-alumina.

8. The process of claim 1 where the hydrocarbon is xylene and the catalyst is $V_2O_5$ promoted with $K_2SO_4$.

9. The process of claim 1 where the hydrocarbon is xylene and the catalyst is $V_2O_5$ supported on silica-alumina.

10. The process of claim 1 where the hydrocarbon is xylene and the catalyst is $V_2O_5$ supported on kaolin.

References Cited
UNITED STATES PATENTS 2,845,449    7/1958    Toland _____ 260—465

LEWIS GOTTS, Primary Examiner

D. H. TORRENCE, Assistant Examiner